United States Patent
Reinberg et al.

(10) Patent No.: US 7,412,547 B2
(45) Date of Patent: Aug. 12, 2008

(54) APPARATUS, SYSTEM, AND METHOD FOR DISTRIBUTED PROCESSING WITH A PERIPHERAL INPUT/OUTPUT CHANNEL BASED DEVICE

(75) Inventors: Kevin Michael Reinberg, Durham, NC (US); Richard Joseph Zabelicky, Raleigh, NC (US)

(73) Assignee: Lenovo Pte Ltd, Singapore (SG)

( * ) Notice: Subject to any disclaimer, the term of this patent is extended or adjusted under 35 U.S.C. 154(b) by 535 days.

(21) Appl. No.: 10/744,667

(22) Filed: Dec. 23, 2003

(65) Prior Publication Data

US 2005/0138237 A1     Jun. 23, 2005

(51) Int. Cl.
*G06F 13/00* (2006.01)
*G06F 9/46* (2006.01)

(52) U.S. Cl. .......................... 710/62; 710/33; 713/120; 713/164; 713/169; 713/200; 380/44; 380/236; 725/81

(58) Field of Classification Search ............... 710/8–10, 710/20, 33, 62, 64, 72; 713/120, 164, 169, 713/200; 380/44, 236; 725/81
See application file for complete search history.

(56) References Cited

U.S. PATENT DOCUMENTS

| | | | |
|---|---|---|---|
| 6,282,714 B1 * | 8/2001 | Ghori et al. ................... 725/81 |
| 6,308,062 B1 * | 10/2001 | Chien et al. .................. 455/420 |
| 6,782,476 B1 * | 8/2004 | Ishibashi ..................... 713/169 |
| 6,816,967 B1 * | 11/2004 | Iijima et al. .................. 713/164 |
| 6,871,248 B2 * | 3/2005 | Riley .......................... 710/106 |
| 7,080,405 B2 * | 7/2006 | Himmel et al. ................. 726/4 |
| 2002/0152381 A1 * | 10/2002 | Kuriya et al. ................ 713/170 |
| 2002/0154775 A1 * | 10/2002 | Yang .......................... 380/236 |
| 2004/0243821 A1 * | 12/2004 | Kim et al. .................... 713/200 |
| 2005/0207573 A1 * | 9/2005 | Asano et al. .................. 380/44 |

* cited by examiner

*Primary Examiner*—Tammara R. Peyton
(74) *Attorney, Agent, or Firm*—Kunzler & McKenzie

(57) ABSTRACT

An apparatus, system and method of distributed processing are disclosed. The apparatus, system, and method communicate a software process from a driver device through a peripheral input/output channel to a processing device. The driver device and the processing device execute a common instruction set. The processing device executes the software process, reducing the processing demand on the driver device. The processing device may interface with a peripheral device through the peripheral input/output channel. In addition, the processing device communicates results data through the peripheral input/output channel in an isochronous transfer to the driver device.

30 Claims, 4 Drawing Sheets

APPARATUS, SYSTEM, AND METHOD FOR DISTRIBUTED PROCESSING WITH A PERIPHERAL INPUT/OUTPUT CHANNEL BASED DEVICE

BACKGROUND OF THE INVENTION

1. Field of the Invention

This invention relates to distributed processing and more particularly relates to distributed processing on a peripheral input/output channel based processing device.

2. Description of the Related Art

Data processing devices such as computer, servers and personal digital assistants ("PDAs") execute software processes to perform a variety of functions. Unfortunately, the data processing devices often execute one or more software processes that require processing bandwidth in excess of the data processing devices' capabilities. Consequently, the execution of a software process may be delayed until sufficient processing bandwidth is available for the data processing device to execute the software process in a timely manner.

Unfortunately, the execution of some software processes cannot be delayed without adverse effects. For example, many audio and video software processes require the execution of specific tasks in specified time intervals, such as completing the processing of a video frame within a television scan cycle. Software processes that require the execution of specific tasks in specified time intervals are referred to as real time processes. If a data processing device has insufficient processing bandwidth to execute software processes such as real time processes, processing demand must be reduced or processing bandwidth must be increased.

Co-processors have been used to increase the processing bandwidth of data processing devices. A data processing device may incorporate a co-processor with a primary processor to increase processing bandwidth. The primary processor executes one or more software processes. In addition, the primary processor may assign the co-processor to execute one or more software processes. The co-processor executes the software process and communicates the results of the software process to the primary processor. Because the co-processor module executes the software process, the processing demand on the primary processor is reduced. Unfortunately, adding the co-processor increases the cost of the data processing device, even if the co-processor is not required.

Distributed processing is also used to reduce the processing demand on a data processing device without incorporating a co-processor. In such an arrangement, a data processing device executes one or more software processes. In addition, the data processing device may assign an external device such as a server to execute one or more software processes. The external device typically receives the software process from the data processing device through a computing communications channel such as a network. In addition, the external device executes the software process and communicates the results to the data processing device through the computing communications channel. The external device decreases the processing demand on the data processing device through distributed processing.

Unfortunately, many data processing devices, particularly mobile data processing devices such as laptop computers or PDAs, do not always have access to the processing bandwidth of an external device such as a server. For example, a user may use a laptop computer to mix MIDI input data from a synthesizer with digital audio at a remote site without access to a network or a server. If the MIDI input and conversion software process and the digital audio mixing software process exceed the processing bandwidth of the laptop computer, the user is not able to distribute software processes to an external device such as the server.

In addition, many data processing devices cannot connect to the computing communications channels typically used for distributed processing such as an Ethernet network or the Internet. For example, a data processing device such as a PDA may only have a peripheral input/output channel designed for communications with peripheral devices such as a universal serial bus ("USB") connection or an infrared communications channel. As a result, users in many situations are unable to increase the processing bandwidth of data processing devices using distributed processing. For example, a user using a PDA to capture audio input data may not have the additional processing bandwidth needed to execute a speech recognition software process. The user may also be unable to communicate the speech recognition software process to an external device such as a server to reduce processing demand through distributed processing.

Consequently, a need exists for a process, apparatus, and system for distributed processing without a network or computing communications channel. Beneficially, such a process, apparatus, and system would increase the processing bandwidth of a data processing device using the original hardware capabilities of the data processing device.

SUMMARY OF THE INVENTION

The present invention has been developed in response to the present state of the art, and in particular, in response to the problems and needs in the art that have not yet been fully solved by currently available distributed processing methods. Accordingly, the present invention has been developed to provide a method, apparatus, and system for distributed processing that overcome many or all of the above-discussed shortcomings in the art.

The apparatus for distributed processing is provided with a logic unit containing a plurality of modules configured to functionally execute the necessary steps of receiving a software process through a peripheral input/output channel ("PIOC"), scheduling the software process, and executing the software process. These modules in the described embodiments include an input/output ("I/O") module, a software manager, a software process, and a processor module.

The apparatus is configured to communicate solely through one or more PIOC. The PIOC is designed for communication with peripheral devices and has a low data transfer rate. In addition, the PIOC supports isochronous transfers of data. In one embodiment, the PIOC is the universal serial bus ("USB"). The PIOC may also be an infrared communications channel. The I/O module receives the software process through the PIOC. The software process may be received from a driver device.

The software manager manages the execution of the software process. In addition, the software manager may manage the function of the apparatus. In one embodiment, the I/O module receives the software manager through the PIOC. In a certain embodiment, the software manager is a real-time operating system. In an alternate embodiment, the software process is designed to operate under the driver device operating system and the software manager emulates the driver device operating system.

The processor module executes the software process under the management of the software manager. In one embodiment, the software process is an audio software process. The processor module executes the instruction set of the driver device. The processor module communicates to the driver device solely through the I/O module and one or more PIOC. The processor module may communicate data from the software process through the I/O module as an isochronous transfer. In one embodiment, the I/O module communicates with a peripheral device through the PIOC.

A system of the present invention is also presented for distributed processing. In particular, the system, in one embodiment, includes a PIOC, a driver device and a processing device. The PIOC is designed for direct device-to-device communications with a peripheral device at a low data transfer rate. The driver device communicates a software process through the PIOC to the processing device. The software process employs the instruction set of the driver device. The processing device executes the software process. In addition, the processing device may communicate data from the software process to the driver device as an isochronous transfer.

The driver device controls the execution of the software process by the processing device. The drive device communicates coordinates the processing device execution. In addition, the processing device communicates responses to the driver device. In one embodiment, the execution of the software process on the processing device is linked with the execution of the driver device.

The system may further include a peripheral device. The processing device communicates with the peripheral device through the PIOC. In one embodiment, the processing device hosts the peripheral device for the driver device.

A method of the present invention is also presented for distributed processing. The method in the disclosed embodiments substantially includes the steps necessary to carry out the functions presented above with respect to the operation of the described apparatus and system. In one embodiment, the method includes receiving a software process, scheduling the software process, and executing the software process. The method also may include receiving a copy protection right and communicating the software process results data.

The method receives the software process through the PIOC. In one embodiment, the software process includes a software manager. In a certain embodiment, the method receives a copy protection right. The method further schedules the execution of the software process. In addition, the method executes the software process. In a certain embodiment, the method communicates the data from the software process through the PIOC as an isochronous transfer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention enables distributed processing for a data processing device without a co-processor and without access to a computing communications channel and a server. In addition, the present invention reduces the processing demand on the data processing device by enabling distributed processing over a PIOC. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
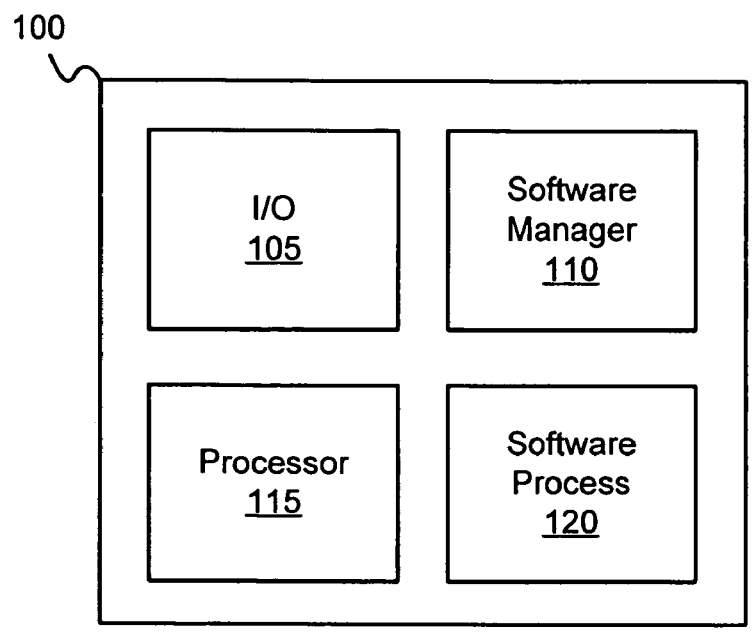
FIG. 1 is a block diagram illustrating one embodiment of a processing device of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a block diagram illustrating one embodiment of a processing device 100 of the present invention. The processing device may take any suitable form, including a computer, server or personal digital assistant ("PDA"). In embodiments described herein, the processing device 100 is configured to receive, schedule, and execute a software process 120. As illustrated, the processing device 100 includes but is not limited to an input/output ("I/O") module 105, a software manager 110, a processor module 115, and a software process 120. Although for simplicity the processing device 100 is shown with one software process 120, any number of software processes 120 may be employed.

The I/O module 105 communicates with a peripheral input/output channel ("PIOC") (not shown). The PIOC is distinguished from computing communications channels such as Ethernet and WiFi as the PIOC is targeted to device-to-device communications with a peripheral device and has a low data transfer rate. A low data transfer rate as contemplated herein is up to 12 megabits per second. The PIOC is further distinguished by communicating data as an isochronous data transfer. The peripheral device may include a printer, a scanner, a computer mouse, and a camera. In one embodiment, the PIOC is a universal serial bus ("USB"). In an alternate embodiment, the PIOC is a printer parallel port channel. In a certain embodiment, the PIOC is an infrared communications channel.

In one embodiment, the PIOC supplies electric current to the processing device 100. The PIOC may supply all the electric current for the processing device 100. In a certain embodiment, the PIOC supplies a portion of the processing device's 100 electric current. The processing device 100 may also have a source of electric current.

The processor module 115 processes instructions and data. In one embodiment, the processor module 115 includes a microprocessor, control logic, and a memory module (not shown). The software manager 110 manages the function of the processor module 115 and the I/O module 105. The I/O module 105 receives a software process 120 from a driver device (not shown) through the PIOC. The processor module 115 and the driver device execute a common processor instruction set. The software manager 110 manages the execution of the software process 120 on the processor module 115.

In one embodiment, the I/O module 105 receives the software manager 110. The I/O module 105 may further identify the software manager 110 and initiate the execution of the software manager 110 by the processor module 115. In a certain embodiment, the software manager 110 is a real-time operating system. In an alternate embodiment, the software process 120 executes under the driver device operating system. The software manager 110 may emulate the function of the driver device operating system in executing the software process 120.

In one embodiment, the I/O module 105 receives input data through the PIOC as an isochronous transfer. The software process 120 may use the input data. The input data may include commands, information, and instructions. In a certain embodiment, the software process 120 generates results data. The results data may include commands, information, and instructions. The I/O module 305 may communicate the results data as an isochronous transfer.

In one embodiment, the software process 120 is an audio software process 120. For example, the I/O module 105 receives an audio software process 120 for converting audio input data in the WAVE audio format defined by Microsoft Corporation of Redmond, Wash., to the MIDI audio format defined by the MIDI Manufacturers Association of Los Angeles, Calif. The software manager 110 initiates and manages the execution of the audio software process 120. The I/O module 105 receives audio input data such as data in the WAVE format. The software process 120 generates results data such as data in the MIDI format. In addition, the I/O module 105 communicates the results data as an isochronous transfer.

In one embodiment, the I/O module 105 communicates with a peripheral device (not shown) through the PIOC. The software manager 110 may manage the interface with the peripheral device. In one embodiment, the processing device 100 hosts the peripheral device. The processing device 100 may reduce the processing demand on a data processing device by the receiving the software process 120 from the data processing device through the PIOC and executing the software process 120.

Figure 2:
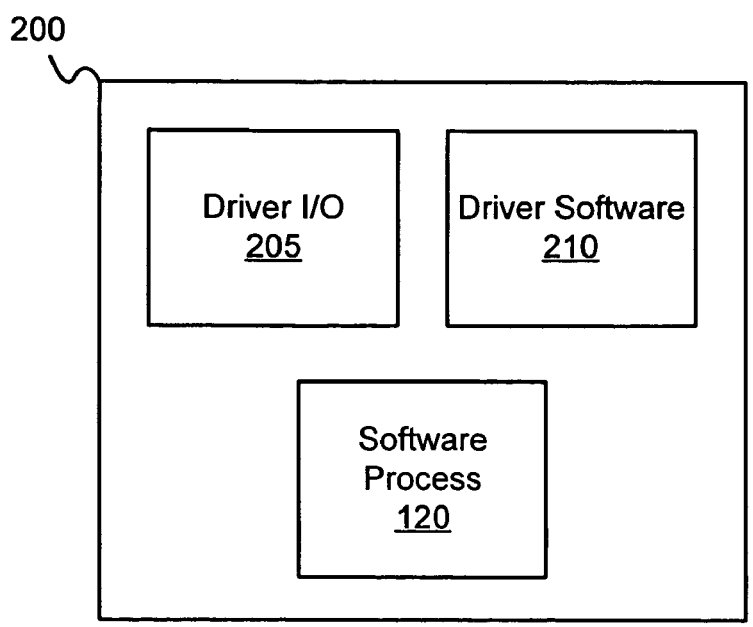
FIG. 2 is a block diagram illustrating one embodiment of a driver device of the present invention.

FIG. 2 is a block diagram illustrating one embodiment of a driver device 200 of the present invention. The device 200 communicates a software process 120 to a processing device 100. The driver device 200 includes a driver I/O module 205, a driver software module 210, and a software process 120.

In one embodiment, the driver device 200 is a data processing device such as a computer or a personal digital assistant ("PDA"). In addition, the driver device 200 may require a reduction in processing demand. In one embodiment, the driver device 200 is a mobile device without access to a computing communications channel. The driver I/O module 205 is in communication with a PIOC (not shown). The driver I/O module 205 communicates the software process 120 through the PIOC to a processing device 100. The processing device 100 executes the software process 120. Communicating the software process 120 may reduce the processing demands on the driver device 200.

Figure 3:
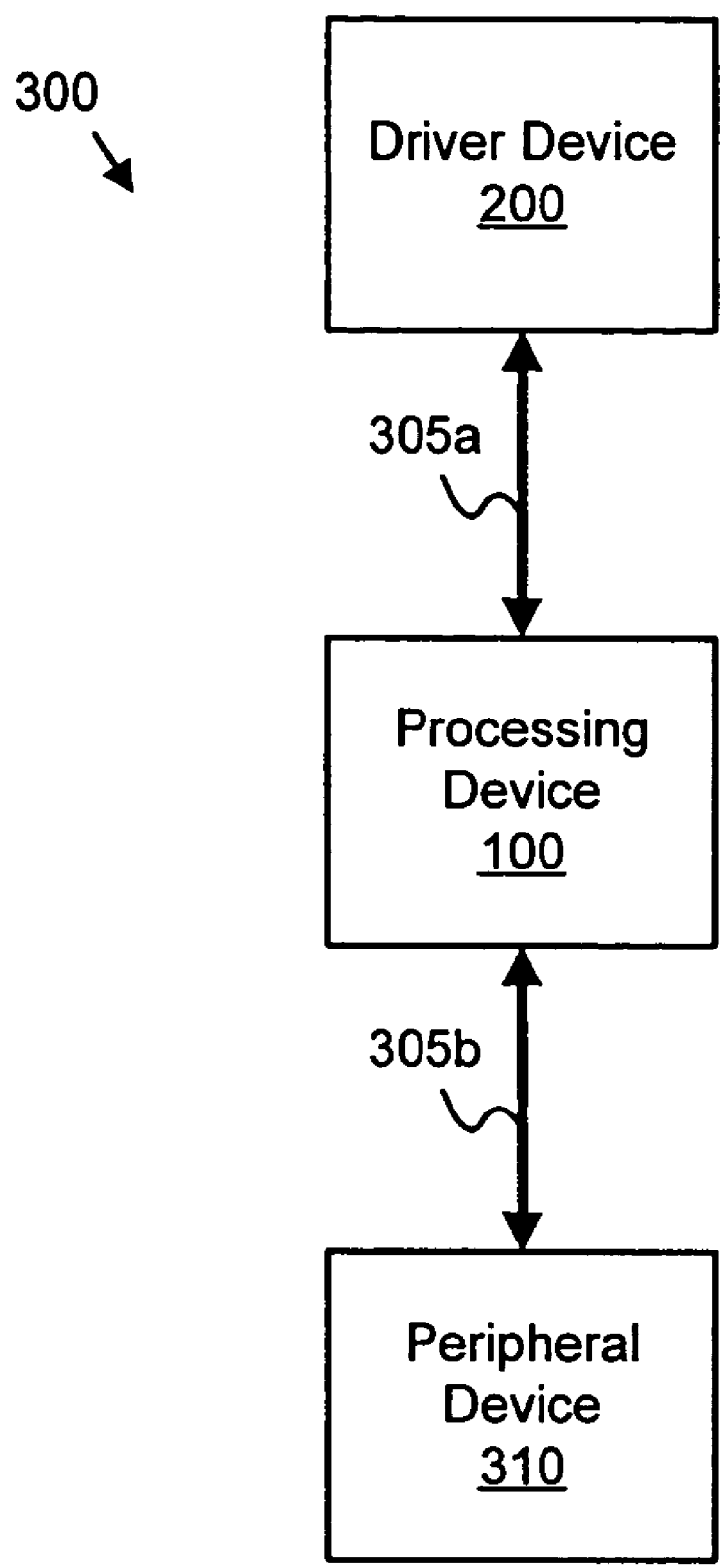
FIG. 3 is a block diagram illustrating one embodiment of a distributed processing system of the present invention.

FIG. 3 is a block diagram illustrating one embodiment of a distributed processing system 300 of the present invention. The system 300 distributes a software process 120 from a driver device 200 to a processing device 100. The distributed processing system 300 includes a processing device 100, a driver device 200, and one or more PIOC 305. In addition, the system 300 may include a peripheral device 310. Although for simplicity, the distributed processing system 300 is shown with one driver device 200, one processing device 100, two PIOCs 305, and one peripheral device 310, any number of driver devices 200, processing devices 100, PIOCs 305, and peripheral devices 310 may be employed.

The driver device 200 communicates the software process 120 to the processing device 100 through the PIOC 305a. The driver device 200 and the processing device 100 execute a common processor instruction set. In one embodiment, the driver device 200 also communicates the software manager 110 through the PIOC 305a to the processing device 100. The processing device 100 executes the software process 120. In addition, the processing device 100 may communicate results data to the driver device 200 through the PIOC 305a as an isochronous transfer.

The driver device 200 communicates commands to the processing device 100 controlling the operation of the processing device 100. In addition, the processing device 100 communicates responses to the driver device 200. The execution of the software process 120 on the processing device 100 is coordinated with the execution of one or more software processes 120 on the driver device 200.

In one embodiment, the processing device 100 communicates with the peripheral device 310 through the PIOC 305b. The processing device 100 may host the peripheral device 310. In a certain embodiment, the processing device 100 hosts the peripheral device 310 for the driver device 200.

In one embodiment, the driver device 200 communicates a copy protection right to the processing device 100. The copy protection right may be a copy protection privilege. The copy protection right may also be a copy protection restriction. In a certain embodiment, the processing device 100 has the copy protection right of the driver device 200.

The software process 120 may be an audio software process 120. In an example of one embodiment of the present invention, the driver device 200 communicates an audio software process 120 to the processing device 100. The driver device 200 may be a PDA and the audio software process 120 may convert input data in the MIDI audio format to the MP3 audio format defined by the Moving Picture Expert Group. The processing device 100 executes the audio software process 120. In addition, the processing device 100 receives MIDI input data from the peripheral device 310. The peripheral device 310 may be a synthesizer. The audio software process 120 calculates MP3 results data from the MIDI input data. The processing device 100 communicates the MP3 results data to the driver device 200 as an isochronous transfer. The distributing processing system 300 may reduce the processing demands on the driver device 200 by communicating the software process 120 to the processing device 100, the processing device 100 executing the software process 120.

Figure 4:
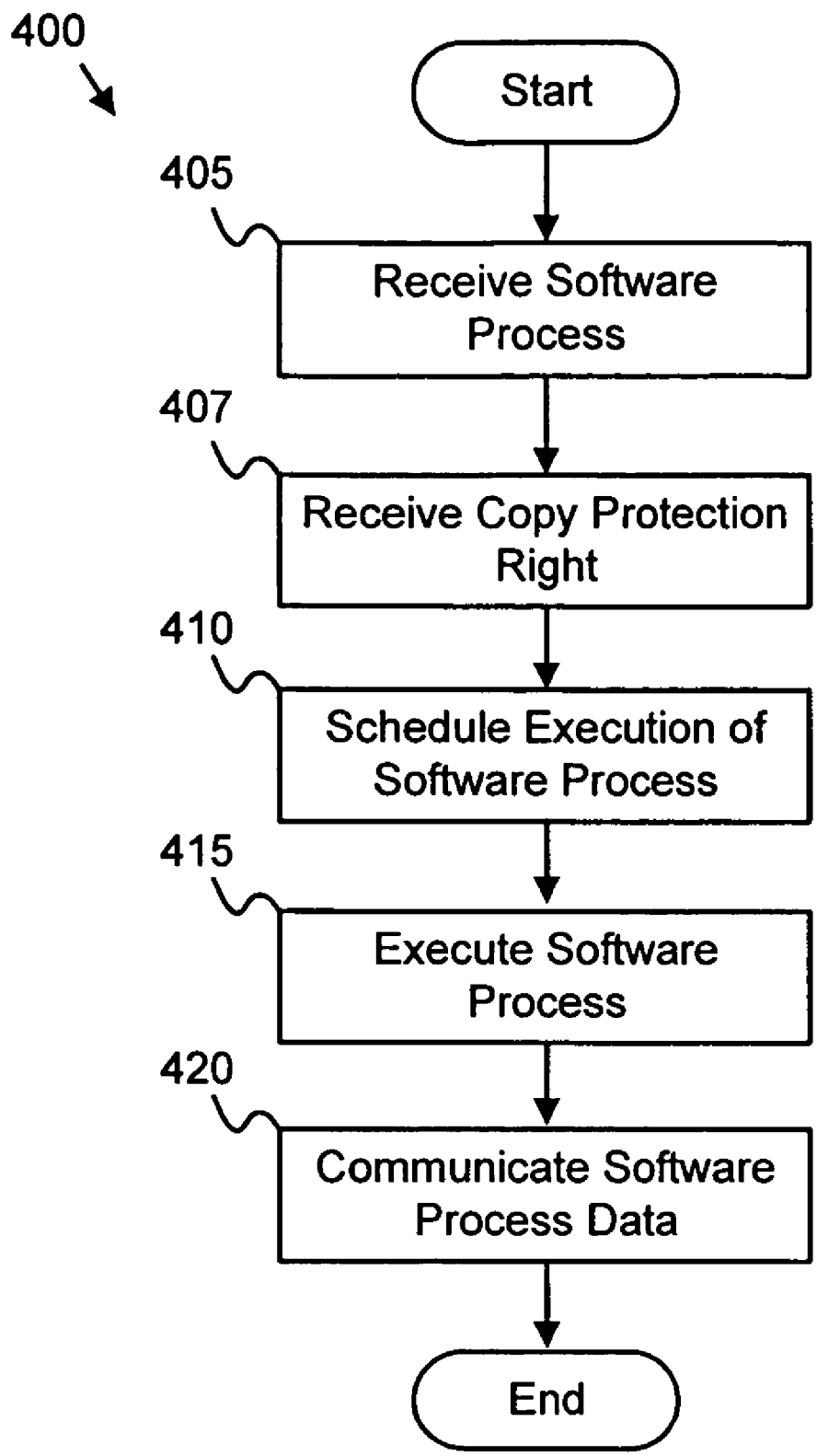
FIG. 4 is a flow chart diagram illustrating one embodiment of a distributed processing method in accordance with the present invention.

FIG. 4 is a flow chart diagram illustrating one embodiment of a distributed processing method 400 in accordance with the present invention. The method 400 receives, schedules, and executes a software process 120. Although for purposes of clarity the distributed processing method 400 is depicted in a certain sequential order, execution may be conducted in parallel and not necessarily in the depicted order.

The distributed processing method 400 receives 405 a software process 120 through the PIOC 305. In one embodiment, the method 400 receives 407 a copy protection right through the PIOC 305. The copy protection right may be the copy protection right of the driver device 200. The distributed processing method 400 may have the copy protection right of the driver device 200. In one embodiment, the method 400 also receives a software manager 110 through the PIOC 305. The distributed processing method 400 schedules 410 the execution of the software process 120. The method 400 further schedules 410 the execution of the software process 120 in response to a command from the driver device 200 communicated through the PIOC 305.

The distributed processing method 400 executes 415 the software process 120 in coordination with the driver device 200. Executing 415 the software process 120 may reduce the processing demand on a data processing device such as the driver device 200.

In one embodiment, the distributed processing method 400 communicates 420 results data as an isochronous transfer through the PIOC. The method 400 may communicate 420 the results data to the driver device 200. In an alternate embodiment, the method 400 communicates 420 the results data to the peripheral device 310. The distributed processing method 400 receives 405, schedules 410, and executes 415 a software process 120, reducing the processing demand for the data processing device.

Figure 5:
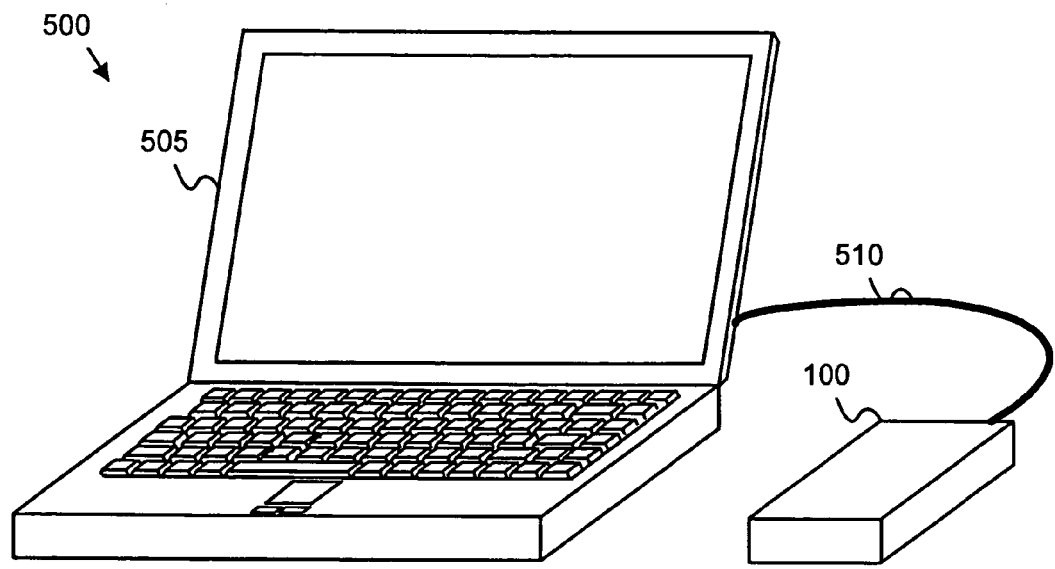
FIG. 5 is a perspective view illustrating one embodiment of a mobile distributed processing system of the present invention.

FIG. 5 is a drawing illustrating one embodiment of a mobile distributed processing system 500 of the present invention. The system 500 enables distributed processing in a mobile data processing device. The mobile distributed processing system 500 includes a mobile data processing device in the form of a laptop computer 505, a PIOC 510, and a processing device 100. Although for simplicity one laptop computer 505, one PIOC 510, and one processing device 100 are depicted, any number of laptop computers 505, PIOCs 510, and processing devices 100 may be employed.

The laptop computer 505 communicates with the processing device 100 through the PIOC 510. The laptop computer 505 communicates a software process 120 to the processing device 100. The processing device 100 executes the software process 120 for the laptop computer 505, reducing the processing demand on the laptop computer 505.

For example, a user may initiate a software process 120 on the laptop computer 505. The software process 120 may require processing resources in excess of the processing resources available on the laptop computer 505. In addition, the laptop computer 505 may not have access to a computing communications channel or a server. The laptop computer 505 communicates the software process 120 to the processing device 100 through the PIOC 510. In one embodiment, the PIOC 510 is the USB. The processing device 100 executes the software process 120 for the laptop computer 505. The mobile distributed processing system 500 reduces the processing demand on the laptop computer 505 by distributing the software process 120 to the processing device 100.

Figure 6:
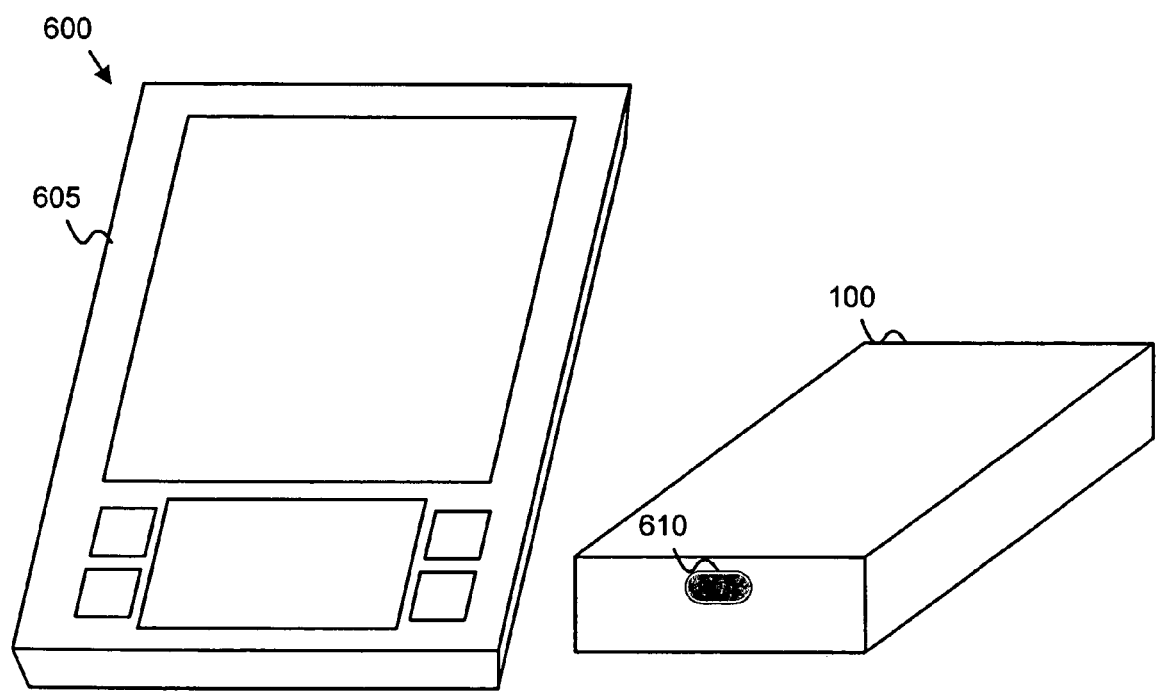
FIG. 6 is a perspective view illustrating one embodiment of a wireless distributed processing system in accordance with the present invention.

FIG. 6 is a drawing illustrating one embodiment of a wireless distributed processing system 600 in accordance with the present invention. The system 600 enables distributed computing for a data processing device without a computing communications channel interface. The wireless distributed processing system 600 includes a data processing device in the form of a PDA 605 and processing device 100. In addition, the processing device 100 may include an infrared communications port 610. Although for simplicity the system 600 is shown with one PDA 605 and one processing device 100, any number of PDAs 605 and processing devices 100 may be employed.

In one embodiment, the PDA 605 includes a PIOC such as a wireless communications interface (not shown). In a certain embodiment, the PIOC is an infrared communications channel. The PDA 605 communicates a software process 120 to the processing device 100, and the processing device 100 executes the software process 120.

For example, the PDA 605 may not be equipped with a computing communications channel interface in order to reduce the PDA 605 form factor. In one embodiment, the PDA 605 is equipped with a PIOC such as an infrared communications channel (not shown). The PDA 605 communicates the software process 120 through the PIOC to the infrared communications port 610 of the processing device 100. The processing device schedules and executes the software process 120, reducing the processing demand on the PDA 605.

The present invention enables distributed processing for a data processing device without a co-processor or access to a computing communications channel. In addition, the present invention increases the processing bandwidth of the data processing device by enabling distributed processing over a PIOC 305 to a processing device 100. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An processing device, the device comprising:
   an input/output module in electrical communication with a peripheral input/output channel, the peripheral input/output channel configured for direct device-to-device communication at a low data transfer rate with isochronous data transfers, the input/output module configured to receive a software process from a driver device, the software process configured to employ the instruction set of the driver device;
   a software manager configured to manage the execution of the software process, wherein the software manager employs the instruction set of the driver device; and
   a processor module configured to execute the software process and the software manager, the processor module receiving commands from the driver device and executing the software process in coordination with the driver device, the processor module further configured to communicate data solely through the peripheral input/output channel of the input/output module as an isochronous data transfer.

2. The processing device of claim 1, wherein the peripheral input/output channel is a universal serial bus.

3. The processing device of claim 1, wherein the peripheral input/output channel is an infrared communications channel.

4. The processing device of claim 1, wherein the software process is an audio software process.

5. The processing device of claim 1, wherein the input/output module is in electrical communication with a peripheral device.

6. The processing device of claim 1, wherein input/output module receives electrical current from the peripheral input/output channel, the electrical current powering the processing device.

7. The processing device of claim 1, the software manager further configured to execute real-time software processes.

8. The processing device of claim 1, wherein the input/output module receives the software manager, the input/output module further configured to initiate the execution of the software manager on the processor module.

9. A processing device, the device comprising:
   an input/output module in electrical communication with a universal serial bus, the input/output module configured to receive an audio software process from a driver device, wherein the audio software process employs the instruction set of the driver device;
   a software manager configured to manage the execution of the audio software process, wherein the software manager employs the instruction set of the driver device; and
   a processor module configured execute the software process and the software manager, the processor module receiving commands from the driver device and executing the software process in coordination with the driver device, the processor module further configured to communicate data as an isochronous transfer solely through the universal serial bus of the input/output module.

10. A driver device, the device comprising:
    a software process configured to employ the instruction set of a driver device;
    an input/output module in electrical communication with a processing device through a peripheral input/output channel, the peripheral input/output channel configured for direct device-to-device communication at a low data transfer rate with isochronous data transfers, the processing device configured to communicate data as an isochronous transfer solely through the peripheral input/output channel; and
    a driver software module configured to communicate the software process to the processing device through the input/output module and the peripheral input/output channel, the driver software module further configured to coordinate the execution of the software process on the processing device.

11. The driver device of claim 10, the driver software module further configured to receive data from the processing device.

12. A system for distributed processing, the system comprising:
    a peripheral input/output channel configured for direct device-to-device communications at a low data transfer rate with isochronous data transfers;
    a driver device in electrical communication with the peripheral input/output channel, the driver device configured to communicate a software process; and
    a processing device in electrical communication with the driver device solely through the peripheral input/output channel, the processing device configured to execute the instruction set of the driver device, the processing device further configured to receive the software process and to execute the software process in coordination with the driver device, the processing device communicating data as an isochronous transfer.

13. The system of claim 12, wherein the processing device receives a copy protection right of the driver device, the processing device configured with the copy protection right of the driver device.

14. The system of claim 12, wherein the peripheral input/output channel is a universal serial bus.

15. The system of claim 12, wherein the peripheral input/output channel is an infrared communications channel.

16. The system of claim 12, the processing device configured to execute a real-time software process.

17. The system of claim 12, further comprising a peripheral device in electrical communication with the processing device.

18. The system of claim 12, wherein processing device receives electrical current from the peripheral input/output channel, the electrical current powering the processing device.

19. A computer readable storage medium comprising computer readable code configured to:
    receive a software process from a driver device through a peripheral input/output channel at a processing device, the peripheral input/output channel configured for direct device-to-device communications at a low data transfer rate, the processing device and the driver device configured to execute a common instruction set, the processing device further configured to communicate data as an isochronous transfer;

schedule execution of the software process on the processing device through the peripheral input/output channel; and execute the software process on the processing device in coordination with the driver device.

20. The computer readable storage medium of claim 19, wherein the peripheral input/output channel is a universal serial bus.

21. The computer readable storage medium of claim 19, the computer readable code further configured to receive a copy protection right from the driver device.

22. The computer readable storage medium of claim 19, the computer readable code further configured to communicate data from the processing device through the peripheral input/output channel to the driver device in an isochronous transfer.

23. The computer readable storage medium of claim 19, the computer readable code further configured to communicate with a peripheral device.

24. The computer readable storage medium of claim 19, the computer readable code further configured to emulate an operating system of the driver device, wherein the operating system is configured to host the software process.

25. The computer readable storage medium of claim 19, the computer readable code further configured to execute the software process as a real-time software process.

26. The computer readable storage medium of claim 19, the computer readable code further configured with a software manager, the software manager configured to manage the software process.

27. A method for distributed processing, the method comprising:

receiving a software process from a driver device through a peripheral input/output channel at a processing device, the peripheral input/output channel configured for direct device-to-device communications at a low data transfer rate, the processing device and the driver device configured to execute a common instruction set, the processing device further configured to communicate data as an isochronous transfer;

scheduling execution of the software process on the processing device through the peripheral input/output channel; and executing the software process on the processing device in coordination with the driver device.

28. The method of claim 27, wherein the peripheral input/out channel is a universal serial bus.

29. The method of claim 27, further comprising receiving the copy protection right of the driver device.

30. An apparatus for distributed processing, the apparatus comprising:

means for receiving a software process from a driver device through a peripheral input/output channel at a processing device, the peripheral input/output channel configured for direct device-to-device communications at a low data transfer rate, the processing device and the driver device configured to execute a common instruction set, the processing device further configured to communicate data as an isochronous transfer;

means for scheduling execution of the software process on the processing device through the peripheral input/output channel; and means for executing the software process on the processing device in coordination with the driver device.

* * * * *